C. WINKLER.
DRIVING GEAR FOR PRINTING MACHINES.
APPLICATION FILED SEPT. 9, 1918.
1,328,220. Patented Jan. 13, 1920.
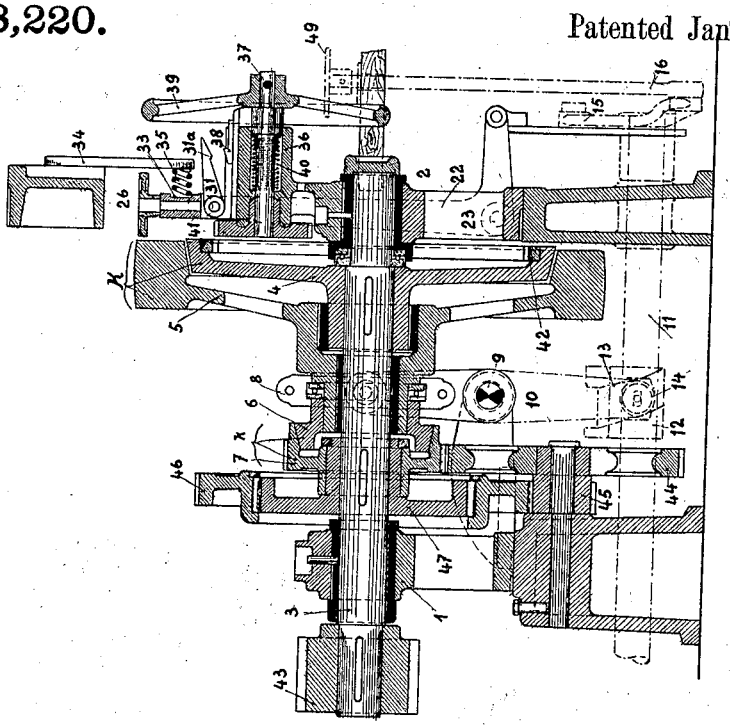
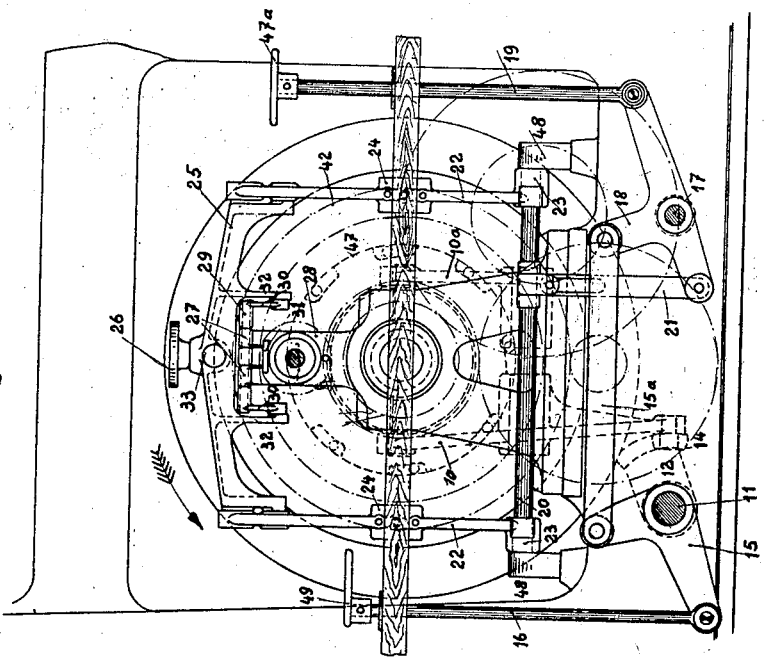
INVENTOR
Carl Winkler
BY
ATTORNEYS

UNITED STATES PATENT OFFICE.

CARL WINKLER, OF BERNE, SWITZERLAND.

DRIVING-GEAR FOR PRINTING-MACHINES.

1,328,220.  Specification of Letters Patent.  Patented Jan. 13, 1920.

Application filed September 9, 1918. Serial No. 253,312.

*To all whom it may concern:*

Be it known that I, CARL WINKLER, a citizen of the Swiss Republic, residing at Berne, in the Swiss Republic, have invented a new and useful Improved Driving-Gear for Printing-Machines, of which the following is a specification.

My present invention relates to an improved driving gear for printing machines, which is provided with two couplings or clutches adapted to be put in and out of operation for the printing speed and for a slow movement, and are so connected with each other by a common member that in one extreme position the machine is driven at the printing speed, in the other extreme position the machine is driven at a slow speed, and in the middle position the machine is braked and stopped. Further, with this improved driving mechanism a manual operative mechanism is provided.

In the drawings, one manner of carrying out the invention is shown by way of example;

Figure 1 is a front elevation, in which several parts are omitted for the sake of clearness.

Fig. 2 is a longitudinal section through Fig. 1.

On the main shaft 3 journaled in the bearings 1, 2, are mounted friction clutches or couplings K, k of which K consists of a member 4 fastened to the main shaft 3, and a coöperating member 5 adapted to slide on the shaft 3, while the clutch or coupling k consists of a sliding member 6, and a coöperating, combined clutch member and spur wheel 7 mounted loosely on the hub of the free wheel 47. The part 6 is fastened to the hub of the friction disk 5. These two connected parts 5 and 6 are surrounded by a ring 8 and can be moved longitudinally on the shaft 3 by this ring with the assistance of the levers 10, 10ª which are connected with the ring on both sides and turn on the spindle 9. On a shaft 11 is provided a cam 12 having a groove 13, in which travels the roller 14 carried by the two-armed lever 10. The groove of this cam has such a form that upon the rotation of said cam the levers 10, 10ª and the spindle 9 are turned so that the connected parts 5 and 6 are moved longitudinally along the main shaft 3.

On the shaft 11 is mounted a bell crank lever 15, to one arm of which the rod 16 is attached. On a pin 17 is mounted a three-armed lever 18, one arm of which is connected with one arm of the bell-crank lever 15 by the rod 15ª. To another arm of the lever 18 the rod 19 is attached, while the third arm is connected with the spindle 20 by the rod 21.

On the spindle 20 are fastened a pair of two armed levers 22 adapted to turn about pins 23 and each provided with a brake block 24 arranged to press against the member 4 of the clutch or coupling K.

A cross piece or yoke 25 connects the levers 22 and carries the horizontal roller 26. In lugs 27 of the bearing 28 there turns a spindle 29, on each end of which is secured a lever 30, and to the middle of which a pawl 31 is fastened. This pawl 31 has an undercut shoulder 31ª adapted to engage the coöperating hooked part 38. The ends of the levers 30 carry bolts, which engage in holes in the arms 32 of the cross piece 25. A recess or seating 33 serves to accommodate the helical spring 35 which presses against the dependent stay 34. The hooked part 38 is guided in a groove in the sleeve 36, the bearing of the spindle 37. The spindle 37 can be turned and moved longitudinally against the tension of the spring 40 by means of a hand-wheel 39. At the end of this spindle 37 a spur pinion 41 is mounted, which can be brought in and out of engagement with the internally-toothed ring 42 fastened to the clutch member 4. The complementary member 5 serves at the same time as a belt or loose pulley, which is preferably constructed as a fly-wheel, and this, apart from the economical utilization of the space by providing the fly-wheel inside the frame of the machine, has the advantage that the part affording the necessary momentum is arranged outside the driving gear proper. As a consequence, the remaining parts are almost at once put into operation when the clutching action is effected, so that the machine begins running at full speed, while when declutched the machine is immediately and quietly stopped, without a brake being absolutely necessary, because the fly-wheel itself is put out of gear.

If the clutch K is brought into operation the driving wheel 43 fixed on the shaft 3 and connected with the printing machine, is driven direct at full speed. If, however, the clutch k is put into operation, the driving wheel 43 receives a reduced speed from the clutch member or pulley 6 through the spur wheels 7, 44, 45, 46. The wheels 44 and 45 are secured together and mounted on a countershaft. The spur wheel 46 by which the reduced speed is given to the shaft 3 is mounted on the free wheel disk 47 fastened to the shaft 3 and carrying on its hub the loose clutch member 7. The free-wheel device will be understood from Fig. 1 where the rollers and inclined planes are shown on the disk 47.

At the normal printing speed, viz., with clutch members 5 and 4 engaged, the gears 7, 44, 45 and 46 remain stationary, while when for the slow speed the clutch $k$ is put into operation the free wheel disk 47 is driven through the train of gearing 7, 44, 45, 46 and the shaft 3 is rotated at a reduced speed.

The operation of this improved driving gear is as follows: When it is desired to put the machine into operation for printing, the pedal 47$^a$ provided on the top of the rod 19 is depressed, and owing to the above described connection of the three-armed lever 18 with the bell-crank lever 15, the cam 12 will thus be turned, so that the roller 14 will come into a straight part of the groove 13 and the friction clutch member 5 will come into engagement with its coöperating part 4. By the longitudinal movement of the clutch member 5 it comes into contact with the roller 26 and presses this roller back against the tension of the spring 35 to such an extent that the brake blocks 24 are lifted away from the clutch member 4. The levers 22 are thus turned about the pinions 23 in the brackets or bearings 48.

The machine is stopped by pressing on the pedal 49 which is arranged on the rod 16, until the roller 14 arrives somewhat beyond the middle of the groove 13, in which position the two clutch members 5 and 4 are put out of engagement.

If the pedal 49 is pressed down further against the tension of the spring 35, the roller 14 will be so moved by the inclined groove 13 that the coupling $k$ will be put into operation, in which case the machine is driven slowly, that is, the driving pinion 43 is driven by the gearing 7, 44, 45, 46 and 47. As soon as the clutch member or fly wheel 5 recedes from the roller 26 in putting the clutch K out of engagement, the cross piece 25 and the levers 22 lose their resistance to the pressure of the spring 35, and the levers 22 are turned by said spring about the pins 23 in the opposite direction to the hands of a clock (Fig. 2), so that the brake blocks 24 are applied to the clutch member 4.

The brake blocks 24 are removed from operative contact with the clutch member 4 when the double-clutch device 5—6 is moved along shaft 3 to engage either clutch member 4 or clutch member 7. During the slow motion, the brake is not put out of operation by lifting the brake blocks 24 by means of the clutch part 5 and roller 26 but is effected by the connection of the bell crank lever 15 through the three-armed lever 18 with the spindle 20, as by this means the levers 22 are turned in the direction of the hands of a clock (Fig. 2) about the pins 23.

In order to operate the machine by hand, the spur pinion 41 is brought into engagement with the internally toothed ring by pressing in the shaft 37 against the tension of the spring 40, in which position it can be kept by the pawl 31 and hooked part 38. In this case the brake 24 is put out of operation by the pawl 31 lifted by the hooked portion or beak of part 38, which pawl, owing to its connection with the cross piece 25 and thus with the levers 22, turns these levers in the direction of the hands of a clock and thus lifts the brake blocks 24 out of operation. By turning the hand-wheel 39 the movement is communicated direct to the driving shaft 3. The fly wheel and motor can continue its rotation without interruption. If now the power driving mechanism is again put into operation the clutch member 5 presses back the roller 26 in the manner described above, and the two arms 32, owing to their connection with the levers 30 fastened on the spindle 29, turn said levers and thus also the pawl 31, so that the spur pinion 41 in engagement with the internally toothed ring 42, is released by the spring 40 longitudinally pressing back the spindle 37.

The advantages of the invention consist in the compact and simple construction of the driving gear owing to the convenient combination of all three devices and particularly in the combination of fly-wheel, pulley and clutch member is one organ.

What I claim and desire to secure by Letters Patent of the United States is:—

1. A driving gear for printing machines, which comprises in combination a shaft, a clutch element fastened to said shaft, a free wheel fastened to said shaft at some distance from said clutch element, a second clutch element mounted on the boss of said free wheel, a third driving clutch part mounted to slide on said shaft and adapted to be brought in and out of connection with said first clutch element, a fourth driving clutch element fastened to said third driving clutch element and adapted to be brought in and out of engagement with said second clutch element, a device common to both said third and fourth driving clutch elements to move same longitudinally on said shaft into engagement with the first or second clutch elements or into an intermediate position, and speed reducing spur wheel gearing adapted to be driven by said second clutch element, substantially as, and for the purpose set forth.

2. A driving gear for printing machines, which comprises in combination a shaft, a clutch element fastened to said shaft, a free wheel fastened to said shaft at some distance from said clutch element, a second clutch element mounted on the boss of said free wheel, a third driving clutch part mounted to slide on said shaft and adapted to be brought in and out of connection with said first clutch element, a fourth driving clutch element fastened to said third driving clutch element and adapted to be brought in and out of engagement with said second clutch element a device common to both said third and fourth driving clutch elements to move same longitudinally on said shaft into engagement with the first or second clutch elements or into an intermediate position, and braking devices adapted by application to said first clutch element to bring said shaft to rest, substantially as, and for the purpose, set forth.

3. A driving gear for printing machines, which comprises in combination a shaft, a clutch element fastened to said shaft, a free wheel fastened to said shaft at some distance from said clutch element, a second clutch element mounted on the hub of said free wheel, a third driving clutch element mounted to slide on said shaft and adapted to be brought in and out of connection with said first clutch element, a fourth driving clutch element fastened to said third driving clutch element and adapted to be brought in and out of engagement with said second clutch element said third driving clutch element being shaped to serve as a combined fly-wheel and pulley, substantially as, and for the purpose, set forth.

4. A driving gear for printing machines, comprising in combination a shaft, a clutch member fastened on said shaft, a second clutch member loosely mounted on said shaft at some distance from said first clutch element, inter-connected driving clutch members adapted to be brought into engagement with either the first or the second of said clutch members, brake blocks, a spring adapted to press said brake blocks against said first clutch member, and means to move said brake blocks out of contact with said first clutch member when one of said inter-connected driving clutch members is connected with either the first or second of said clutch members, substantially as, and for the purpose, set forth.

5. A driving gear for printing machines, comprising in combination a shaft, a clutch element fastened to said shaft, a second clutch element loosely mounted on said shaft at some distance from said first clutch element, inter-connected driving clutch elements, means to bring said inter-connecting driving clutch elements into engagement with either the first or the second of said clutch elements or into intermediate position, spur-wheel reducing gearing adapted to be driven by said second loose clutch element, a toothed element fastened to said first clutch element, a spur-wheel adapted to be brought in and out of engagement with said toothed element, a pawl device adapted to keep said spur-wheel in engagement with said toothed element and means to put said pawl device out of operation when said inter-connected clutch elements are brought into engagement with either the first or second of said clutch elements, substantially as, and for the purpose set forth.

6. A driving gear for printing machines, comprising in combination a shaft, a clutch element fastened on said shaft, a second clutch element loosely mounted on said shaft at some distance from said first clutch element, inter-connected driving clutch elements loosely mounted on said shaft, means to bring said inter-connected driving clutch elements into engagement with either the first or second clutch element or into intermediate position, reducing gearing adapted to be driven by said second clutch element, a toothed element fastened to said first clutch element, a spur-wheel adapted to be brought into engagement with said toothed element, a crank adapted to turn said spur-wheel, a pawl device adapted to keep said spur-wheel in engagement with said toothed element, means adapted to automatically release said pawl device when said inter-connected driving clutch members are brought into engagement with either the first or second clutch element, brake blocks, a spring adapted to press said brake blocks against said first clutch member, and means adapted to automatically put said brake blocks out of action either when said inter-connected driving clutch elements are brought into engagement with said first and said second clutch members or when said spur-wheel is brought into engagement with said toothed element, substantially as, and for the purpose set forth.

In testimony whereof I have signed my name to this specification in the presence of two subscribing witnesses.

C. WINKLER.

Witnesses:
  O. MEERBACHE,
  CHEHKLINCH.